RE 25047
Sept. 2, 1958  R. E. RISLEY  2,850,299
FLEXIBLE INSULATING COUPLING FOR THREADED PIPE
Filed Sept. 22, 1953  5 Sheets-Sheet 1
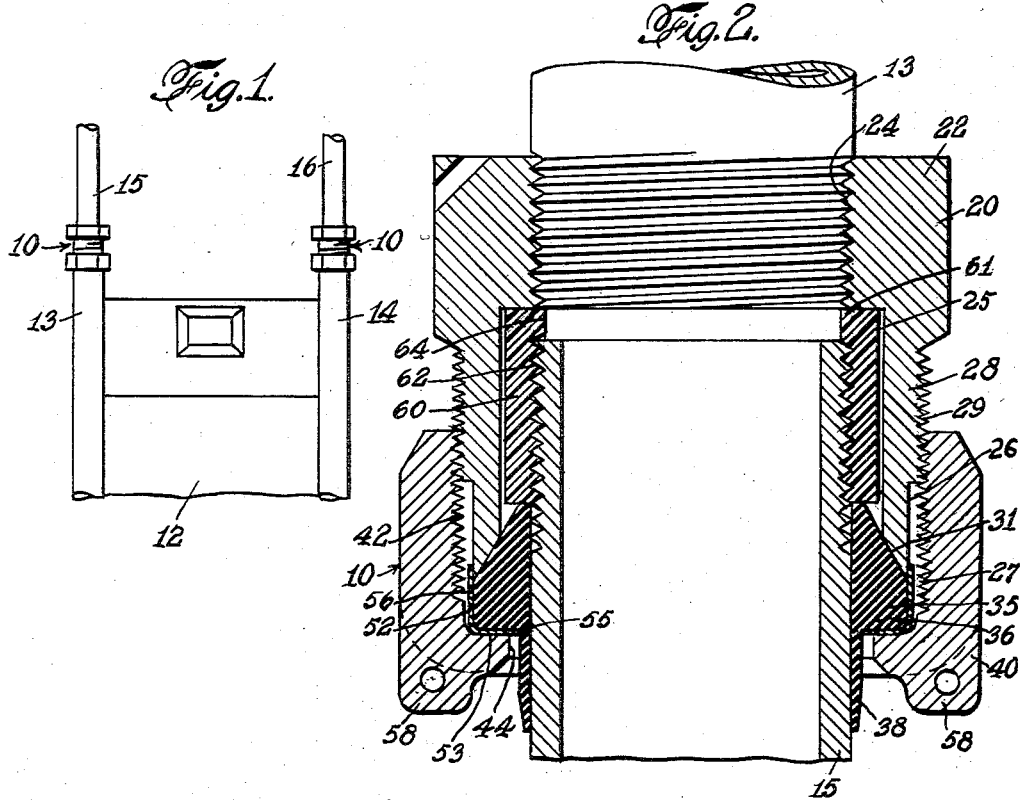
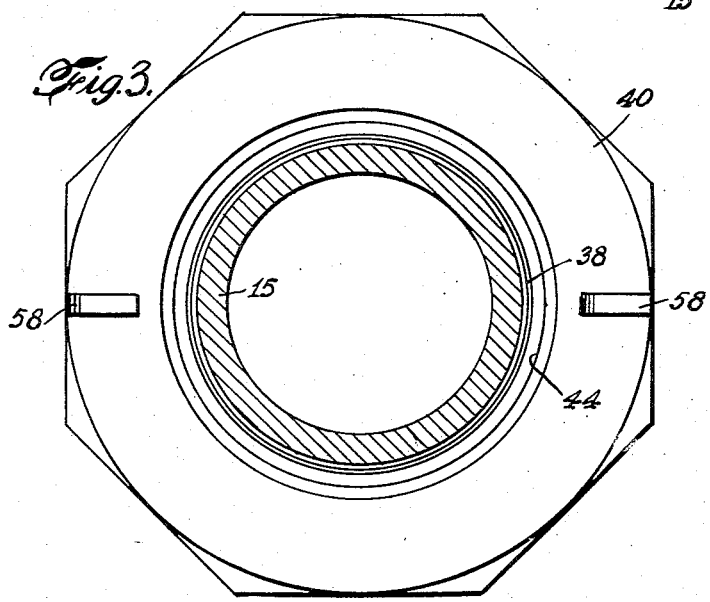

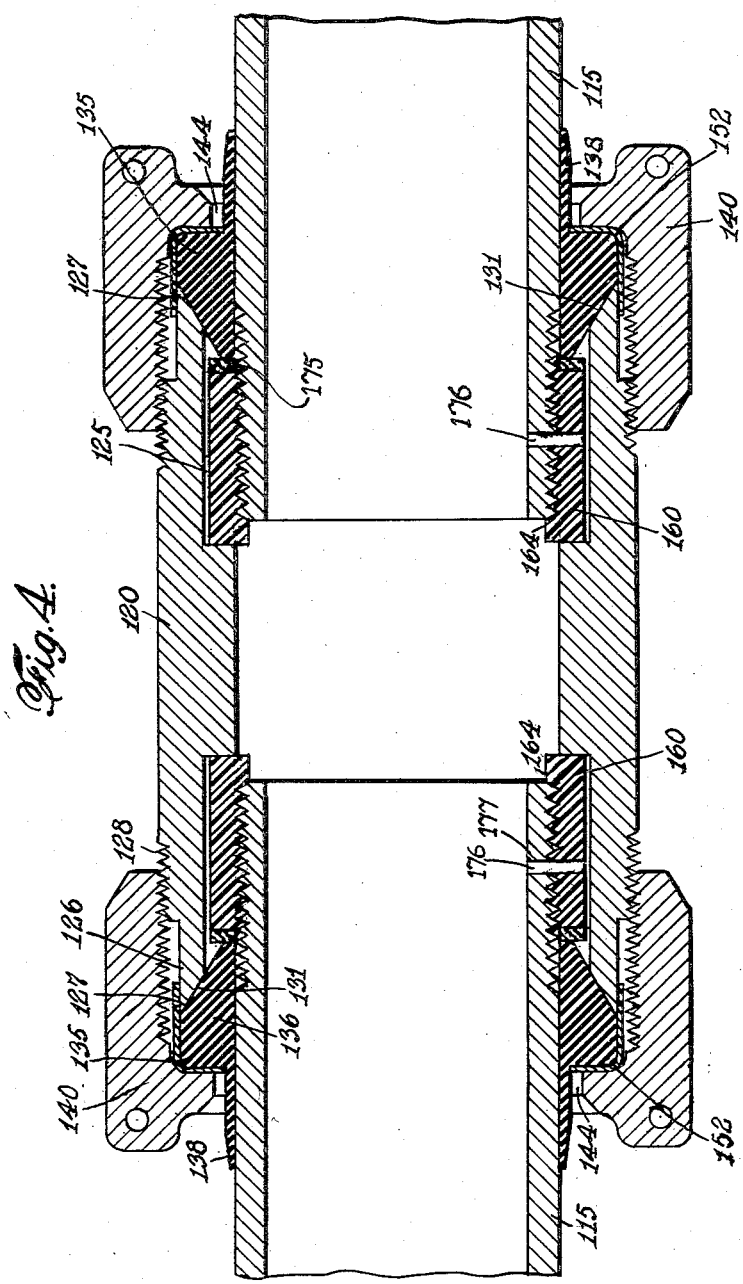

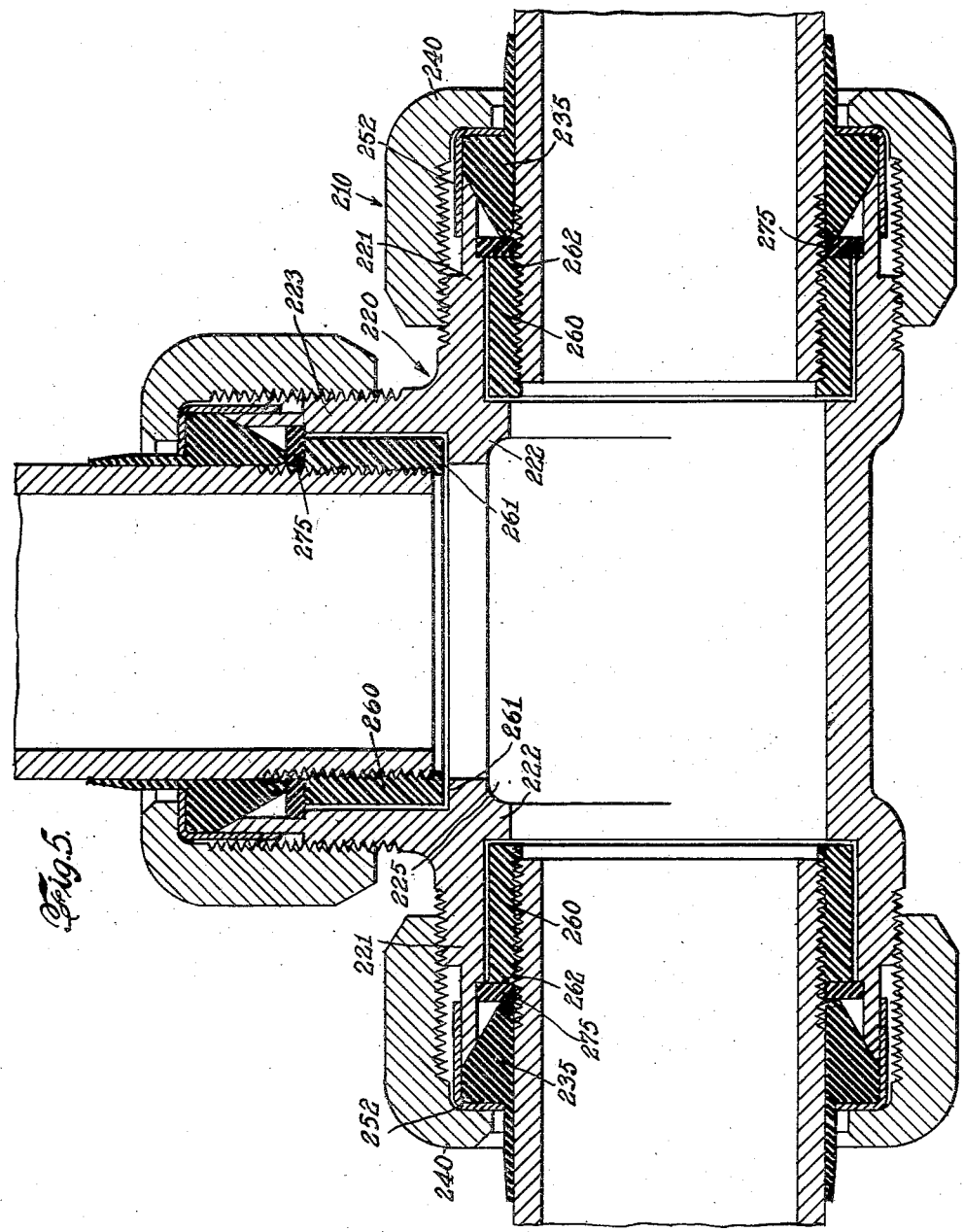

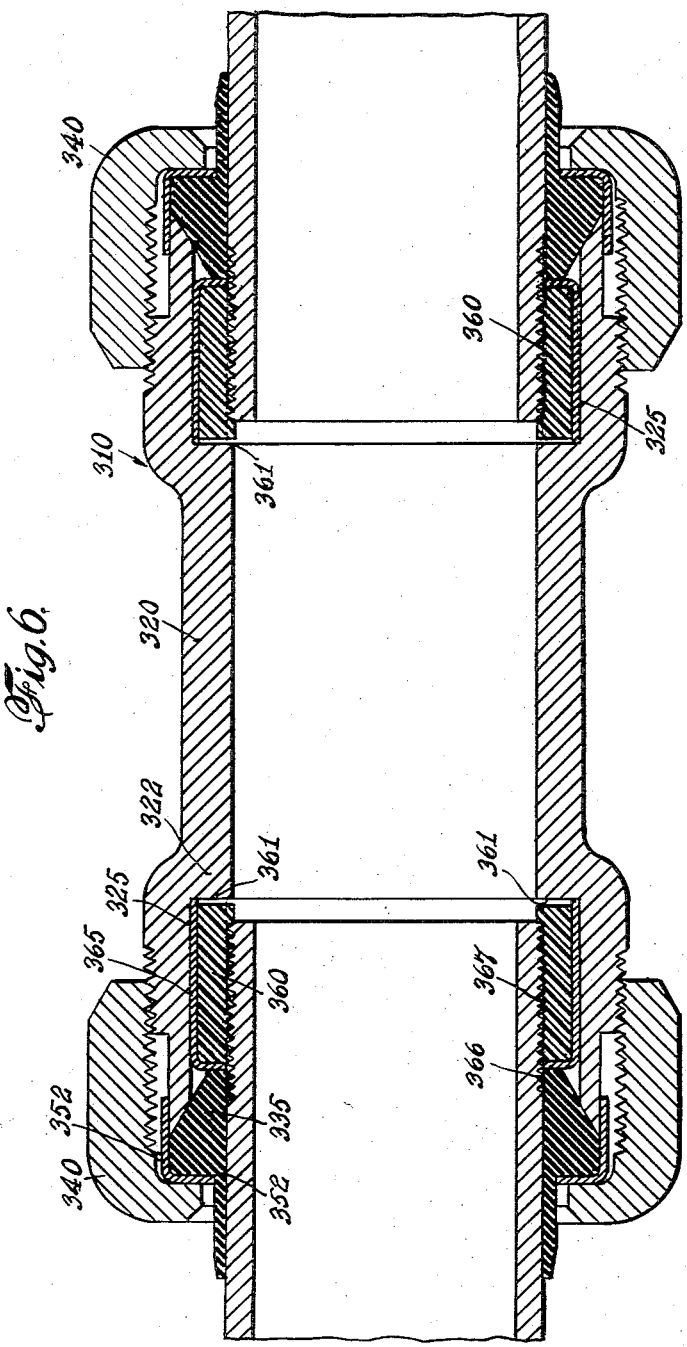

Sept. 2, 1958 R. E. RISLEY 2,850,299
FLEXIBLE INSULATING COUPLING FOR THREADED PIPE
Filed Sept. 22, 1953 5 Sheets-Sheet 5
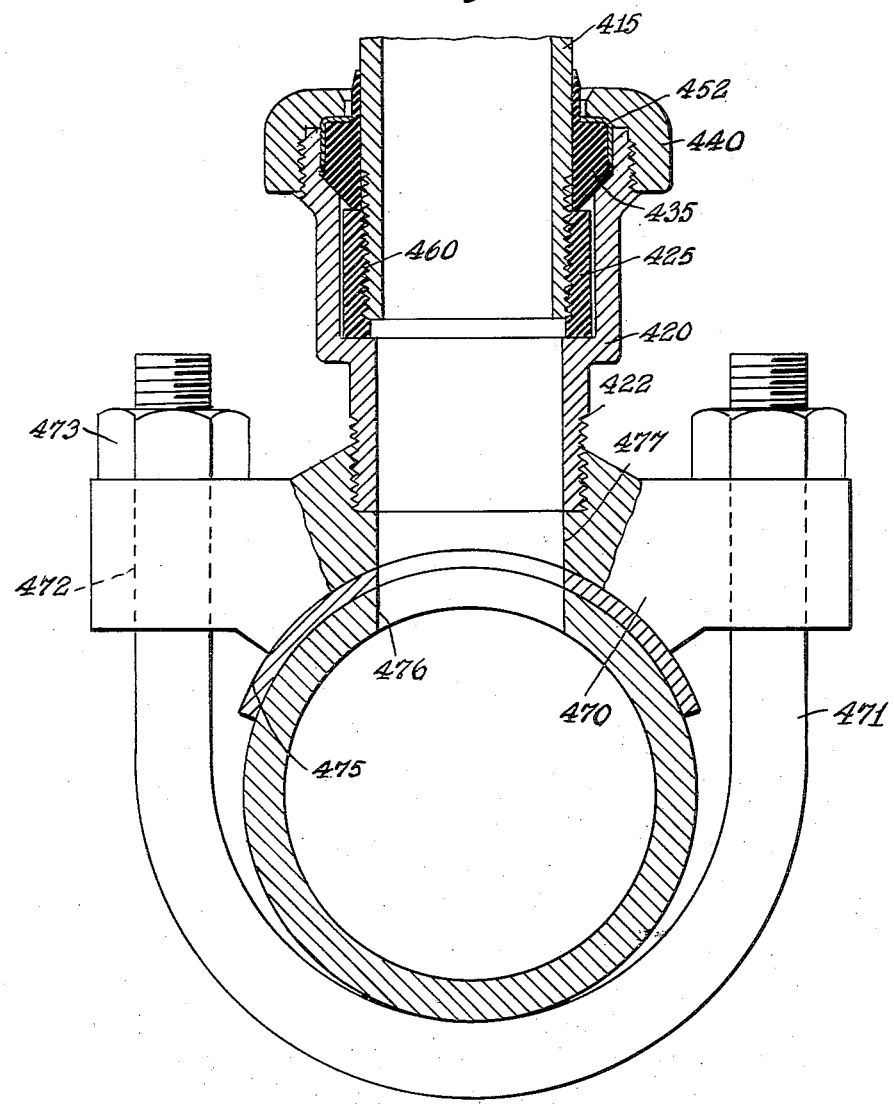
INVENTOR
ROGER E. RISLEY
BY
ATTORNEY

United States Patent Office 2,850,299
Patented Sept. 2, 1958

2,850,299

FLEXIBLE INSULATING COUPLING FOR THREADED PIPE

Roger E. Risley, Bradford, Pa., assignor to Dresser Industries, Inc., a corporation of Delaware Application September 22, 1953, Serial No. 381,704

2 Claims. (Cl. 285—48)

This invention relates to fittings for joining sections of pipe and like fluid conduits, hereinafter referred to generically as "pipe," and is more particularly concerned with electrically insulating fittings of the character indicated which effectively prevent the flow of electrical currents between the fluid conduits interconnected by the fittings. More specifically, the invention relates to insulating fittings in the nature of adapters and couplings for connecting threaded pipe in flexible fluid-tight relationship adapted to permit limited axial movement of the pipe but resisting excessive longitudinal stresses and preventing accidental or undesired axial disengagement of the pipe from the fitting.

Metal pipes laid underground or in contact with the ground tend, by reason of their lower electrical resistance with respect to the soil, to pick up electrical currents emanating from a variety of sources such as street car tracks, industrial power grounds, induced currents from parallel lines, chemical action of the soil, and the like. When the current is permitted to flow along a line unimpeded, serious damage to the line by electrolytic action frequently results. A major practical problem in the construction of pipe lines is consequently the adequate protection of the lines from damage by electrolytic action. It is of great practical importance to reduce to a minimum the need for repair or replacement of one or more sections of the lines since such maintenance is expensive and time-consuming and necessitates costly interruptions in service.

To avoid this deleterious electrolytic or galvanic action by preventing the conduction of electric currents through the line and preventing electrically conductive contact between the sections of the line, it has been proposed to insulate each joint, as by insulating the coupling from one or both of the adjacent pipe sections. Thus, in installations involving so-called compression couplings, it has been proposed to enclose the end of one of the pipe sections by a sleeve of the same rubbery composition used to form the gasket of the coupling. In some instances the rubber sleeve has been made integral with the gasket.

While such construction is generally adequate under ordinary conditions, when the line is subjected to considerable axial stresses contact between the two abutting pipe sections or between one or both of the pipe sections and the coupling may occur owing to undue outward or inward axial movement of the pipes with respect to the coupling.

It has also been proposed to insulate the coupling from the pipe by a member formed of sheet metal coated with insulating enamel. Since, however, the sheet metal body of such a member is not of insulating material, any failure of the enamel coating completely nullifies the effectiveness of such a member as an insulator. In service the severe stresses to which the coupling is frequently subjected cause chipping to the enamel and consequent exposure of the bare metal of the insulating member. Furthermore, while such metal insulating sleeves are effective in preventing direct contact between the ends of the abutting pipe sections, they do not provide effective means for preventing contact between the pipe sections and the coupling upon outward axial movement of the pipes.

The heretofore proposed insulating couplings have not, moreover, been of the locking type, i. e. they have not been effective to insure against outward axial movement of the pipes with respect to the coupling, which in some cases may actually result in a complete separation of the pipe sections from the coupling. In vertical pipe arrangements where, for example, a pipe line may extend for 100 to 300 ft. vertically or at an acute angle, the couplings which hold together the many sections of pipe which are required to make up such lines, must not only provide a fluid-tight joint between each pipe section but must also resist the longitudinal stresses exerted by weight of the pipe sections. The longer the pipe line, of course, the greater the stress. It is in this type of installation in particular that prior insulating couplings have not been entirely satisfactory. Difficulty has also been experienced with prior insulating couplings in industrial installations which are subjected to considerable vibration and flexing. Such vibration and flexing has in many cases resulted in sufficient movement of the pipe within the coupling that metal to metal contact has resulted.

Related problems arise in the installation of meters in gas distribution lines to measure the amount of gas withdrawn through each branch line leading to a residential or industrial consumer's gas pipe system. In such installations, the meter is generally connected to the end of the consumer's pipe system and to the end of the utility branch line by means of a coupling fitting commonly referred to as an adapter, which permits the outlet and inlet pipes of the meter to be connected to the ends of the consumer's line and the utility line, respectively without threaded interengagement. The use of the adapter makes it possible to install or to remove and replace the meter without necessitating any disassembling of the gas lines. However, at the same time, it is desired that the connection between the meter and the gas lines be a locking one so that the meter cannot be accidentally or maliciously disconnected from the lines. It is also desired that flow of electrical currents through the meter be prevented, i. e. it is of practical importance to prevent the conduction of house or plant currents through the meter into the gas service and distribution lines when such lines are not already protected against current flow. Electrolytic corrosion in such lines is most frequently caused by domestic and industrial power grounds passing from the consumer's lines through the meter into the utility distribution lines.

It is an object of the present invention to provide an insulating pipe fitting for connecting pipes in fluid-tight, electrically-insulating engagement.

It is another object of the invention to provide an insulating fitting which avoids the drawbacks and deficiencies of the insulating fittings heretofore known.

It is a further object of the invention to provide an insulating lock fitting adapted to permit relative axial movement of the pipes to which the fitting is connected but to prevent displacement of the pipes from the fittings by strong outward axial stresses tending to withdraw the pipes from the fitting.

It is another object of the invention to provide an insulating lock coupling for flexibly yet securely connecting the ends of threaded pipe.

It is a further object of the invention to provide a locking insulated adapter.

It is a still further object of the invention to provide an insulating lock fitting for pipe which may be installed rapidly and easily.

According to the invention there is provided a pipe fitting for joining threaded pipe ends in locking, fluid-tight and electrically insulating relationship, which comprises a sleeve body adapted to receive the two pipe ends, an insulating sleeve member or collar disposed in the sleeve body and adapted for threaded engagement with a pipe end, a resilient insulating gasket, and a threaded nut engageable with an end of the sleeve body for applying compressing pressure to the gasket to force the gasket into sealing engagement with the interior of the end of the sleeve body and with the insulating sleeve and the surface of the pipe end with which it is engaged. The gasket is formed with an axial extension adapted to pass through the aperture in the nut to prevent electrically-conductive contact betweent the nut and the pipe end.

It is a feature of the fitting of the invention that the elements of the fitting cooperate to hold the pipe ends securely yet permit limited relative axial movement of the pipe ends without permitting their withdrawal from the fitting when subjected to severe axial stresses.

It is another feature of the invention that electrically-conductive contact between the pipe ends is prevented at all time regardless of the relative position of the pipe ends in the fitting and regardless of the degree of axial stress applied to the pipe ends.

Other objects and features of the invention will be readily apparent from the following detailed description of illustrative embodiments thereof and from the accompanying drawings, wherein Fig. 1 is a partial elevational view of a gas meter installation showing the use of a fitting embodying features of the present invention;

Fig. 2 is a longitudinal cross sectional view, on an enlarged scale, of the fitting illustrated in Fig. 1, showing the relative relationship of parts;

Fig. 3 is an end elevational view of the fitting illustrated in Fig. 2, showing the pipe in section;

Fig. 4 is an axial sectional view of an insulating lock pipe coupling constructed in accordance with the invention;

Fig. 5 is a similar view of an insulating lock T coupling constructed in accordance with the invention;

Fig. 6 is a cross-sectional view of a modified form of the coupling shown in Fig. 4; and Fig. 7 is an elevational view, partly in section, illustrating another embodiment of the invention.

Referring to the drawings, and more particularly to Figs. 1 to 3, the reference numeral 10 designates generally a pipe coupling in the nature of an adapter constructed in accordance with the invention and adapted primarily for connecting a gas meter in a gas distribution system. As shown in Fig. 1, a gas meter 12, having an inlet pipe 13 and an outlet pipe 14, is connected in the gas flow line provided by the supply pipe 15 and the distribution pipe 16, by means of fittings 10 which connect the supply pipe 15 to the inlet pipe 13 and connect the distribution pipe 16 to the outlet pipe 14. Referring to Figs. 2 and 3, the coupling or adapter 10 has a sleeve body 20 which has an enlarged end 22 formed with a threaded pipe-receiving aperture 24. The aperture 24 communicates with an enlarged non-threaded chamber 25 defined interiorly of the other end of body 20 which is of reduced external diameter and increased internal diameter. Exteriorly, the latter end is formed with a cylindrical portion 26 extending from the outer edge 27 of the body to a raised annular section 28, the outer surface of which is provided with threads 29. From the edge 27, the body tapers inwardly to define a gasket recess 31.

Fluid-tight sealing engagement between the body 20 and the ends of the pipe to be joined, e. g. pipe 15 or 16, is effected by compression of a gasket 35 which is adapted to be received in the gasket recess 31 and which, in the embodiment illustrated, is annular in form and is shaped to provide a main body portion 36 which is received in the end of the coupling body 20 and a sleeve portion 38 which is of substantially lesser radial thickness than the gasket body 36 and is adapted to extend outwardly along the pipe surface beyond the end of the coupling body 20. While in the preferred embodiment of the invention the gasket is thus formed with an integral sleeve, the sleeve and the gasket may be formed separately. The gasket 35 and the sleeve are formed from rubber or rubber composition, this term being used generically to include natural and synthetic rubbers and other elastomeric compounds, or compositions having like properties and characteristics. The material is relatively firm and solid but sufficiently resilient and elastic to flow under pressure to conform to the surfaces between which it is confined. Advantageously gasket 35 is formed from a rubbery composition which is relatively resistant to attack by hydrocarbon gases and oils. Examples of such resistant rubber compositions suitable for use in the coupling of the invention are butadiene-acrylonitrile copolymers, such as those known commercially by the trade designations Buna–N or GR–A. The gasket is not limited to these specific materials, however, and particularly when special resistance to hydrocarbon gases and oils is not required, any rubbery composition having the above-noted characteristics may be employed.

Gasket 35 is compressed and urged into sealing engagement with the pipe 15 by means of a follower nut 40, which is provided with internal threads 42 for engagement with the threads 29 of annular section 28. The follower nut 40 is formed with a pipe aperture 44 which is of sufficiently large diameter to receive the pipe to be connected, e. g. the pipe 15 and the gasket sleeve portion 38. In order to confine and protect the gasket 35 and to prevent frictional resistance by the gasket when the follower nut 40 is rotated in tightening or loosening the coupling, there are provided suitable gasket retainer means. In the embodiment shown in Fig. 2, the gasket retainer takes the form of a cup-shaped annular member 52 conveniently stamped or otherwise formed from a metal sheet to define a body portion 53 formed with an aperture 55 sufficiently large to receive pipe 15 and sleeve 38 and a peripheral flange 56 which is dimensioned to be received by the cylindrical portion 26. In the adapter illustrated, the follower nut 40 is formed with apertured ears or projections 58 adapted to receive sealing wires to permit attachment of the usual utility company seal on the meter installation.

Positioned within coupling body 20 and disposed in chamber 25 is an annular insulating sleeve member or collar 60 which is shaped to conform to the inner surface of the chamber 25 and is adapted to receive the end of the pipe. For this purpose, as shown in Fig. 2, the insulating member 60 is internally threaded as indicated at 62 over the major portion of its length but has an unthreaded portion 64. The member 60 threadedly engages the forward end of pipe 15 but the unthreaded portion 64 prevents the pipe from passing entirely through member 60. As a result, the unthreaded portion 64 serves as an insulating extension of the pipe and effectively prevents all electrically conductive contact between the pipe and the coupling body. As shown in the drawing, the external diameter of the member 60 is greater than the diameter of pipe aperture 44 in follower nut 40 with the result that once the follower nut is engaged with the coupling body, the pipe 15 cannot be axially pulled out of the coupling. Not only does the gasket 35 resist outward movement of the pipe by reason of its engagement with the member 60 but the member 60 will mechanically engage follower nut in the event the pipe is subjected to sufficient force to pull the member 60 beyond the gasket.

The insulating member 60 is formed from a resilient, non-frangible material which is, however, relatively resistant to deformation. The member 60 is advantageously formed from a relatively rigid insulating plastic material such as polystyrene, a phenol-formaldehyde resin, a urea-formaldehyde resin, and the like. The member 60 is conveniently formed from such materials by conventional molding techniques. The member 60 may, however, be formed from a less rigid insulating material, for example, a synthetic elastomeric compound or composition such as neoprene (polychloroprene) or other compounds or compositions having like properties and characteristics. However, the insulating member 60 is thus formed from a material which is substantially more resistant to deformation than the material used in forming the gasket 35.

By means of the insulating adapter 10 it is possible to install a gas meter rapidly and efficiently in a manner which protects it and the pipe line connected to it from the damaging action of stray electrical currents. To make the installation shown in Fig. 1, for example, the adapter sleeve bodies 20 are screwed to the meter inlet pipe 13 and outlet pipe 14. The follower nuts 40, the retainers 52 and the gaskets 35 are slipped over the ends of the supply pipe 15 and the distribution pipe 16, the insulating members 60 are screwed on to the ends of these pipes, and the meter with the sleeve bodies is then brought into position to permit threaded engagement of the follower nuts with the sleeve bodies.

The two pipe sections of the meter installation are thus connected in fluid-tight, flexibly-locked, non-conducting relationship. In Fig. 1 the meter installation illustrated employs two adapters 10. However, one of the adapters 10 will suffice to prevent flow of electric current through the meter, and the other adapter could, if desired, be replaced by one of conventional non-insulating construction. From the standpoint of ease of installation and of effective locking against axial thrusts, however, it is preferable to use both of the adapters 10. The adapters 10 may, if desired, be inverted, i. e. with the supply and distribution pipes threadedly engaged in the aperture 24 and with the meter pipes in engagement with the insulating members 60 and the gaskets 35. Further, while the adapter 10 has been shown in a meter installation, its usefulness is not limited to such arrangements and it may be used wherever an insulating, locking joint between two pipes is desired, particularly when strong axial thrusts will be encountered.

Regardless of the type of installation, the adapter 10 will effectively resist removal of the pipes when in service while effectively maintaining its sealing and insulating action. In the event of inward axial stress on the pipes, the insulating member 60 will be forced against the end of the chamber 25 which is the shoulder 61 defined by the internally-threaded portion of the body 20 and at all times electrically-conductive engagement between the pipes 15 and 16 and the bodies of the corresponding adapters will be prevented, so that flow of current through the meter and through the line in which the meter is placed is avoided. Upon axial stress on the pipes in the adapters 10, the insulating member 60 will be drawn toward the follower nut 40. However, at the same time the gasket 35 will be given an axial thrust which will resist further outward movement of the member 60 and the pipe upon which it is mounted. At the same time the axial thrust will increase the sealing pressure of the gasket on the pipe and escape of gas will be prevented.

The invention is, however, not limited to an adapter coupling as shown in Figs. 1 to 3 but may be embodied in insulating saddles, couplings and fittings of other types for interconnecting two or more pipes. In Fig. 4, wherein parts corresponding to those shown in Figs. 1 to 3 have been given like reference numerals to which 100 has been added, there is shown a coupling of the type in which two colinearly-disposed pipes are connected without threaded engagement therewith. In Fig. 4, the reference numeral 120 designates the sleeve body or "middle ring" of the coupling illustrated which is in the form of a tubular sleeve having symmetrical ends. Each end of sleeve 120, like the smaller end of adapter 20, has an exterior surface defined by a cylindrical portion 126 extending from the outer edge 127 to a raised threaded annular section 128.

Interiorly, the ends of sleeve 120 taper inwardly from the edges 127 to define gasket recesses 131 which communicate with the interior chamber 125. Seated in gasket recesses 131 are gaskets 135, formed from the material used for gasket 35, as above described. Each gasket 135 has a main body portion 136 and a sleeve portion 138 adapted to embrace the pipe 115 and extending outwardly along the pipe surface beyond the end of sleeve 120. Gasket sealing is effected by means of retainers 152 and follower nuts 140, substantially identical in construction to retainer 52 and follower nut 40 except that the ears 58 are not provided in this embodiment. Positioned within the chamber 125 are annular insulating members 160, each threadedly engaging one of the pipes 115, with the unthreaded portions 164 of the members in opposed relationship. The insulating members 160 are substantially identical in form and material of construction to the insulating member 60 above described, and have an external diameter which is greater than the diameter of the pipe apertures 144 in the follower nuts 140. The relationship of parts in such as shown that the gaskets 135 disposed adjacent the members 160 and outward axial movement of either of the pipes causes the members 160 to exert an axial thrust on the gaskets to increase their sealing action.

The coupling 110 when installed on the ends of the pipes 115 thus provides an insulating, locking, flexible connection between the pipes. By reason of the flexibility of the joint, shocks and vibrations are absorbed while the fluid-tightness and insulating effectiveness of the joint are maintained at all times.

In order to insure against removal of the pipe from the fitting when the lock wire is in position, there may be advantageously provided locking means for preventing rotation of the pipe without concurrent rotation of the insulating member. Examples of such locking means are shown in the coupling of Fig. 4 but it will be apparent that these locking means are equally applicable to the other embodiments illustrated and to other fittings in which the invention may be embodied. As shown in Fig. 4, an insulating washer 175, e. g. a fibre washer, is positioned around the pipe between the toe of the gasket and the axially outer face of the insulating member 160. The washer 175 prevents the gasket from holding the insulating member 160 against rotation when the pipe is rotated. Ordinarily, frictional contact with the gasket may be sufficient to hold the member 160 against rotation and thereby permit the pipe to be unscrewed out of it. Another locking means for the insulating member 160 which may be used independently of or in combination with the washer 175 is also shown in Fig. 4. This means comprises an insulating pin 176 formed from fibre or other like rigid insulating material. The pin is passed through an aperture 177 drilled in the insulating member 160 and in the pipe wall. When the pin locking means is employed, the insulating member 160 is first screwed on the end of the pipe, then an aperture 177 is drilled through the member and the pipe and the insulating pin 176 inserted. The pipe with the member thus attached is then inserted in the fitting end and the gasket and follower nut drawn up as previously described.

In accordance with another embodiment of the invention, means are provided for preventing application of the gasket pressure to the insulating members and thereby to prevent the gaskets from holding the members from rotation with their respective pipe sections. Such an embodiment, in the form of a T, is shown in Fig. 5, wherein parts corresponding to those shown in Figs. 1 to 3 have been given the same reference numerals to which 200 has been added. As shown in Fig. 5, the coupling sleeve body or "middle ring" 220 defines runs 221 and a branch 223 which are adapted to receive the pipes to be interconnected, the branch 223 extending from the body 220 substantially centrally thereof. The branches and the T are provided with cooperating retainers 252, follower nuts 240, and gaskets 235. Interiortly the middle ring 220 defines chambers 225 and is formed with annular ribs 222 which provide shoulders 261 against which the insulating members 260 will engage to resist inward axial thrusts. Axially outwardly of chambers 225 the internal diameter is increased to define shoulders 262 and insulating washers 275, similar in construction to washers 175 shown in Fig. 4, are dimensioned to engage these shoulders. When pressure is applied to the gaskets, they are driven against the washers 275, which are held against inward axial movement by the shoulder 262 and thus the gaskets do not apply pressure to the members 260 which are free to rotate with the pipes. Like the fittings shown in Figs. 1 to 4 the T 210 provides an electrically-insulating, positively-locking, flexible connection among the pipes with which it is associated.

In the embodiment of Fig. 6 a somewhat modified construction is employed to separate the gaskets from the insulating members. Referring to Fig. 6, wherein parts corresponding to those shown in Fig. 2 have been given like reference numerals to which 300 has been added, the coupling 310 is similar in construction to the coupling 110 of Fig. 4 except for the gasket-pressure resisting element which frees the insulating member from the gasket. As shown in Fig. 6, the middle ring 320 has a central rib 322 defining shoulders 361 and chambers 325 wherein are seated the insulating members 360 which surround the ends of the pipes 315. The ends of middle ring 320 are provided with retainers 352, nuts 340 and gaskets 335. Resisting the inward thrust of the gaskets and shielding the insulating members 360 are pressure resisting elements 365 which have a radial wall portion 366 engaging the "toe" of the adjacent gasket 335 and an axial flange portion 367 which has a greater length than the insulating member 360 and engages the shoulder 361. The elements 365 are formed from any convenient insulating material.

It will be apparent that the invention may be embodied in pipe fittings other than those described above. In Fig. 7, for example, there is shown a saddle provided with an insulating pipe connector constructed in accordance with the invention. The saddle comprises an arcuate body plate 470 secured to the pipe by means of U-bolts 471 which pass through apertures 472 in the body plate and are secured by nuts 473. A gasket 475 seals the joint between thea perture 476 in the pipe and the central bore 477 of the body plate. Threadedly engaged in the bore 477 is the connector 420 having an externally threaded inner end portion 422 and an outer end portion defining a chamber 425 ending in the shoulder 461. As in the embodiment of Fig. 2, connector 420 is provided with a retainer 452, a follower nut 440 and a gasket 435. Seated in the chamber 425 and surrounding the pipe 415 is the insulating member 460. By use of the connector 420 the pipe 415 is electrically insulated from the main line pipe upon which the saddle is mounted. Instead of being a removable element, the connector 420 may be formed integrally with the saddle body plate to provide a unitary fitting for joining a branch line to a main line in electrically non-conducting relationship.

It will be apparent to those skilled in the art that various changes and modifications may be made in the embodiments described and illustrated without departing from the scope of the invention as defined in the appended claims. It will further be understood that, insofar as they are not mutualy incompatible, the various features and details of construction of the several embodiments shown and described are interchangeable with one another. It is intended, therefore, that all matter contained in the foregoing description and in the drawing shall be interpreted as illustrative only and not as limitative of the invention.

What I claim and desire to secure by Letters Patent is:

1. An insulating pipe fitting adapted to receive the end of a threaded pipe and to hold said pipe in flexible fluid-tight relationship but with the pipe locked in said fitting against excessive outward axial movement comprising, in combination, a tubular body having at least one end defining a pipe-receiving opening, said body forming a gasket recess with an inwardly-sloping wall adjacent said opening and said body having a chamber with a cylindrical wall surface axially inwardly of said gasket recess, a resilient insulating gasket seated in said recess for surrounding and sealingly engaging said pipe, said gasket having a tapered end to bear against said sloping wall and extending into said chamber, nut means engageable with said body to apply pressure to said resilient gasket to cause said gasket to engage said pipe and said recess in flexible yet sealing relationship, said nut means having a central pipe-receiving aperture and the diameter of said chamber being greater than the diameter of said aperture, insulating sleeve means extending axially-outwardly from said gasket and adapted to overlie said pipe and to pass through said pipe-receiving aperture with a clearance between the sleeve means and the surface of said nut means adjacent said aperture to prevent electrically-conductive contact between the pipe and said nut means, a tubular sleeve member of hard insulating material disposed in said chamber with a clearance between the outer surface of said member and said cylindrical wall surface, said sleeve member being internally threaded for threaded engagement with the end of said threaded pipe, said sleeve member being colinear with said gasket and in lateral engagement with the forward portion of said gasket extending into said chamber, whereby outward axial movement of said sleeve member will exert a lateral thrust upon said gasket, the external diameter of said hard insulating sleeve member being greater than the diameter of said aperture in said nut means, and means to resist extrusion of said gasket through said aperture.

2. An insulating pipe fitting as defined in claim 1, wherein said body has a threaded end for threaded connection with a second pipe.

References Cited in the file of this patent

UNITED STATES PATENTS

| | | |
|---|---|---|
| 476,188 | Connor | May 31, 1892 |
| 602,564 | Peeples | Apr. 19, 1898 |
| 646,742 | Knudson | Apr. 3, 1900 |
| 718,826 | Dick et al. | Jan. 20, 1903 |
| 1,678,955 | Rockebauer | July 31, 1928 |
| 2,211,776 | Haury | Aug. 20, 1940 |
| 2,269,695 | Scharf | Jan. 13, 1942 |
| 2,278,479 | Parker | Apr. 7, 1942 |

FOREIGN PATENTS

| | | |
|---|---|---|
| 616,577 | France | Feb. 4, 1927 |
| 104,877 | Australia | Sept. 1, 1938 |
| 891,167 | France | Nov. 28, 1943 |